US007683301B2

(12) United States Patent
Papamichael et al.

(10) Patent No.: US 7,683,301 B2
(45) Date of Patent: Mar. 23, 2010

(54) METHOD FOR PREVENTING INCORRECT LIGHTING ADJUSTMENT IN A DAYLIGHT HARVESTING SYSTEM

(75) Inventors: Konstantinos Papamichael, El Macero, CA (US); Keith Graeber, Davis, CA (US); Erik Page, Winters, CA (US); Michael Siminovitch, Woodland, CA (US)

(73) Assignee: The Regents of the University of California, Oakland, CA (US)

( * ) Notice: Subject to any disclaimer, the term of this patent is extended or adjusted under 35 U.S.C. 154(b) by 547 days.

(21) Appl. No.: 11/704,037

(22) Filed: Feb. 8, 2007

(65) Prior Publication Data

US 2007/0189000 A1 Aug. 16, 2007

Related U.S. Application Data

(60) Provisional application No. 60/771,770, filed on Feb. 8, 2006.

(51) Int. Cl.
*G01J 1/32* (2006.01)

(52) U.S. Cl. ................................ 250/205; 250/214 AL

(58) Field of Classification Search ................. 250/205, 250/214 AL, 214 B, 214 C, 214 D, 214 R; 315/291–312, 149–159; 362/276, 802; 340/555–557
See application file for complete search history.

(56) References Cited

U.S. PATENT DOCUMENTS 7,049,575 B2 * 5/2006 Hotelling .............. 250/214 AL

OTHER PUBLICATIONS

LRC Press Release, Apr. 20, 2006, "Scientists Develop Simple Alternative for Harvesting Daylight and Saving Energy" [online, retrieved on Feb. 8, 2007 from http://www.lrc.rpi.edu/resources/newsroom/pr_story.asp?id=75].

Levitron MiniZ Daylighting Control [online, retrieved on Feb. 8, 2007 from http://www.leviton.com/OA_HTML/ibeCCtpSctDspRte.jsp?section=15197].

WattStopper Lightsave LS-101 Daylighting Controller cutsheet [online, retrieved on Feb. 8, 2007 from http://www.wattstopper.com/products/details.html?id=180].

* cited by examiner

*Primary Examiner*—Que T Le
(74) *Attorney, Agent, or Firm*—Park, Vaughan & Fleming LLP; Mark Spiller

(57) ABSTRACT

One embodiment of the present invention provides a system for preventing incorrect lighting changes in a daylight-harvesting system, which controls the output of a lighting system based on the presence of daylight and/or other light sources to reduce energy usage. During operation, the system measures a first light level using a first sensor. Next, the system measures a second light level for a different field-of-view using a second sensor. When the system detects through the first sensor a change in the first light level, the system determines from the second sensor whether the second light level has also changed. If the first sensor and the second sensor both detect a change (in the same direction) in the measured light levels, the system adjusts the light output of the lighting system to maintain target light levels for the area.

20 Claims, 6 Drawing Sheets
(5 of 6 Drawing Sheet(s) Filed in Color)

METHOD FOR PREVENTING INCORRECT LIGHTING ADJUSTMENT IN A DAYLIGHT HARVESTING SYSTEM

RELATED APPLICATION

This application claims priority under 35 U.S.C. section 119(e) to U.S. Provisional Application Ser. No. 60/771,770, entitled "Dual Photo-Sensor Dimming Daylight Controls," by inventors Konstantinos Papamichael and Keith Graeber, filed on 8 Feb. 2006, the contents of which are herein incorporated by reference.

COLOR DRAWINGS

The patent or application file contains at least one drawing executed in color. Copies of this patent or patent application publication with color drawing(s) will be provided by the Office upon request and payment of the necessary fee.

BACKGROUND

1. Field of the Invention

The present invention relates to lighting control systems. More specifically, the present invention relates to a technique for preventing incorrect lighting adjustments in a daylight-harvesting system.

2. Related Art

Most commercial spaces with windows receive enough daylight to at least partially reduce the need for electric lighting. Daylight-harvesting systems take advantage of this fact by reducing the amount of electric lighting used when there is sufficient daylight present. For instance, a daylight-harvesting system can dim or switch electric lights to complement the amount of available daylight. Reducing electric lighting in this way can provide significant energy savings and can reduce peak energy demand.

However, installing and maintaining daylight-harvesting systems can involve substantial expense and effort, and such systems can suffer from reliability issues. For instance, the sensors used in daylight-harvesting systems can be affected by factors other than variations in daylight. Such factors can cause over-dimming or annoying light-level fluctuations that can lead to occupant frustration and result in the eventual disablement of the system.

Hence, what is needed is a method and an apparatus for improving daylight-harvesting systems.

SUMMARY

One embodiment of the present invention provides a system for preventing incorrect lighting changes in a daylight-harvesting system, which controls the output of a lighting system based on the presence of daylight and/or other light sources to reduce energy usage. During operation, the system measures a first light level using a first sensor. Next, the system measures a second light level for a different field-of-view using a second sensor. When the system detects through the first sensor a change in the first light level, the system determines from the second sensor whether the second light level has also changed. If the first sensor and the second sensor both detect a change (in the same direction) in the measured light levels, the system adjusts the light output of the lighting system to maintain target light levels for the area.

In a variation on this embodiment, the system uses the first sensor and the second sensor together to prevent incorrect lighting changes due to factors other than the variation of daylight in the area. Factors that can cause improper behavior of a daylight-harvesting system can include: changes in the occupancy and/or reflectance in an area; and daylight variations that do not affect the light levels in an area monitored by a sensor.

In a further variation, the first sensor is a closed-loop sensor, which measures a light level that includes both the light output of the lighting system as well as other light sources.

In a further variation, the system uses two or more closed-loop sensors with different fields-of-view to prevent incorrect lighting changes.

In a further variation, the second sensor is an open-loop sensor that measures a light level that is not affected by light emanating from the controlled light system.

In a further variation, the light level measured by the second sensor relates to present daylight levels. For instance, the second sensor can measure an outdoor light level.

In a variation on this embodiment, the system monitors the relationship between the light levels measured by the first sensor and the second sensor over time to improve the lighting control for the area.

In a variation on this embodiment, other light sources can include natural and/or artificial light entering the area from one or more of the following: a skylight; a window; a direct-beam daylighting system; an atrium; a clear-story window; and an electric-lighting source.

In a further variation, the system uses an open-loop sensor to improve the operation and reliability of two or more closed-loop sensors that are used to manage the light levels for different areas.

In a further variation, a controller for the lighting system communicates with an open-loop sensor and/or one or more closed-loop sensors using a wired and/or wireless network.

In a variation on this embodiment, the lighting system can be an on-off lighting system and/or a dimming lighting system. A dimming lighting system can involve stepped and/or continuous dimming.

In a variation on this embodiment, either or both of the two sensors can be integrated into a light fixture.

In a variation on this embodiment, one or both of the sensors can be a photosensor.

In a further variation, one or both of the sensors can be a camera.

DETAILED DESCRIPTION

Figure 1:
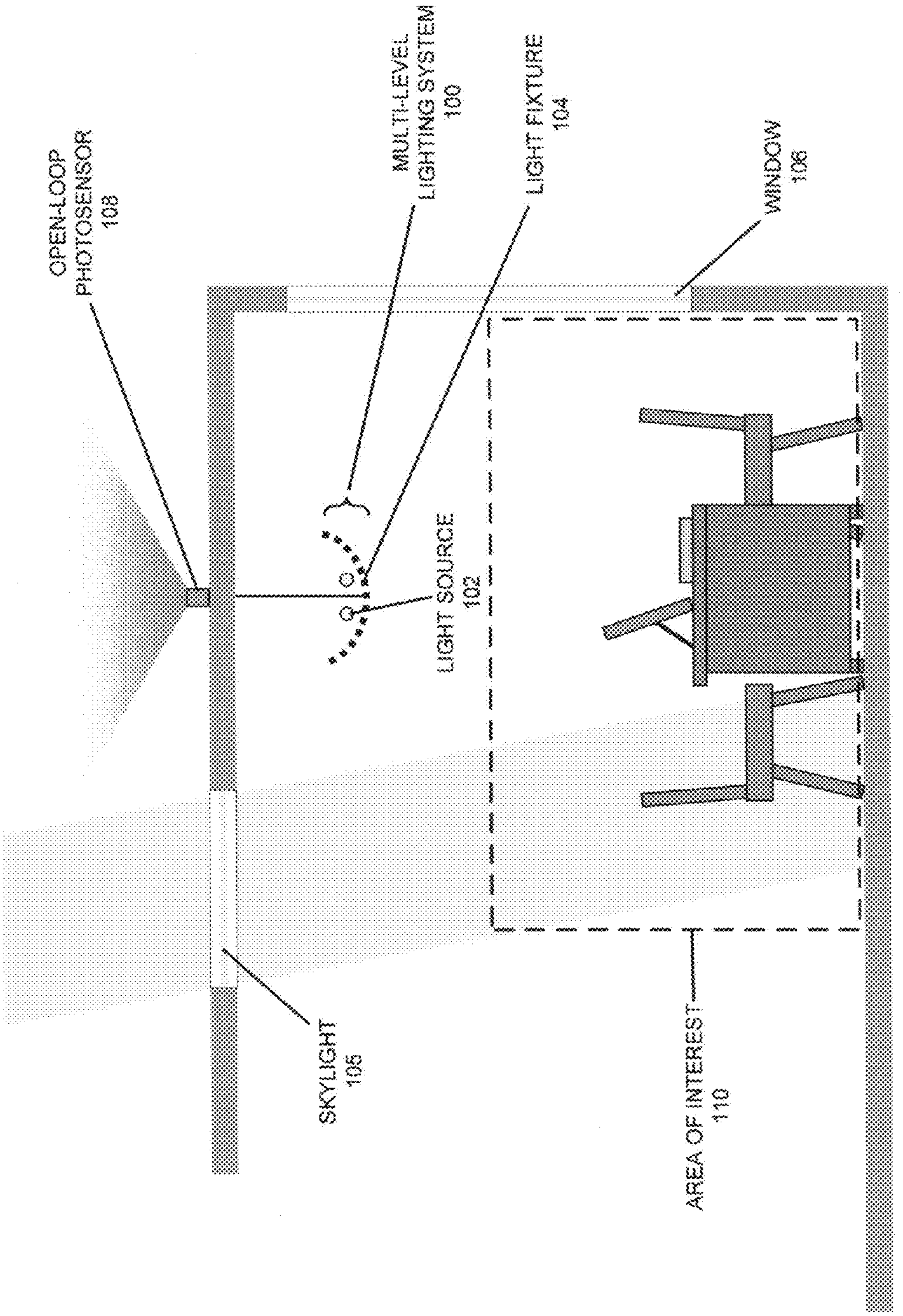
FIG. 1 illustrates an open-loop daylight-harvesting system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Daylight-Harvesting Systems

Daylight-harvesting techniques can be very effective in areas next to windows and skylights, and can provide adequate daylight even on foggy, overcast winter days. Such daylight-harvesting systems can use dimming, switching, and other techniques to provide multiple light levels and thereby save energy when adequate daylight is available. Dimming techniques can use dimming ballasts to adjust the light output of the lighting system. In switching systems, a number of individually-switchable lighting elements in the lighting system allow the output of the lighting system to achieve a wide range of light-output levels.

In one embodiment of the present invention, a daylight harvesting system includes one or more of the following:

- a photosensor that measures the illuminance in an area of interest;
- a microcontroller that adjusts light sources between one or more steps from a high to a low state based on input from the photosensor;
- one or more light sources that are controlled by the microcontroller;
- a user control; and
- an occupancy sensor.

Note that these components can be housed in a single unit, and the microcontroller (also known as the controller) may be integrated into another component. Alternatively, the components may be distributed and communicate wirelessly or using wires. Components of the daylight-harvesting system can be mounted on ceilings, walls, light fixtures, and/or other surfaces.

Daylight-harvesting systems typically use a photosensor to measure light levels in the area of interest, and then adjust one or more light sources to ensure that a target level of light is available in the area. Note that the target level can be identified in one or more ways. For instance, the target level can be defined as a range specified by an on set-point, which indicates the light level at which the light output of the lighting system will be increased, and an off set-point, which indicates the light level at which the light output of the lighting system will be reduced.

The photosensor can be used in either a closed-loop feedback approach or an open-loop feedback approach. In an open-loop daylight-harvesting system, the light level measured by the photosensor does not include the output of the lighting system. For instance, an open-loop photosensor may be an outdoor sensor positioned on the outside of a building, or an interior sensor positioned to look outside through a window or skylight.

FIG. 1 illustrates an open-loop daylight-harvesting system. A multi-level lighting system 100 includes one or more light sources 102 in one or more light fixtures 104. The light output of the light fixture(s) 104 is complemented by daylight and/or other natural or artificial lighting sources, such as electrical lights or sunlight entering the area via a window 106, a skylight 105, an atrium, a clear-story window, or a direct-beam daylighting system. A microcontroller (not shown) may use dimming or switching to adjust the output of the multi-level lighting system 100, thereby achieving a target level of light in a given area of interest 110. In FIG. 1, an open-loop photosensor 108 is positioned to monitor the level of daylight outside of a building. Note that the open-loop photosensor 108 is typically affected by daylight and/or other external light sources. Because the area monitored does not include the area illuminated by the multi-level lighting system 100, the open-loop photosensor does not sense the light (from the multi-level lighting system 100) that is being controlled.

In a closed-loop daylight-harvesting system, the photosensor measures both daylight and the output of the lighting system being controlled. A closed-loop daylight-harvesting system can use the light level measured for an area of interest 110 as direct feedback for the lighting system. For instance, a closed-loop photosensor may be mounted on an interior ceiling or lighting fixture.

Figure 2:
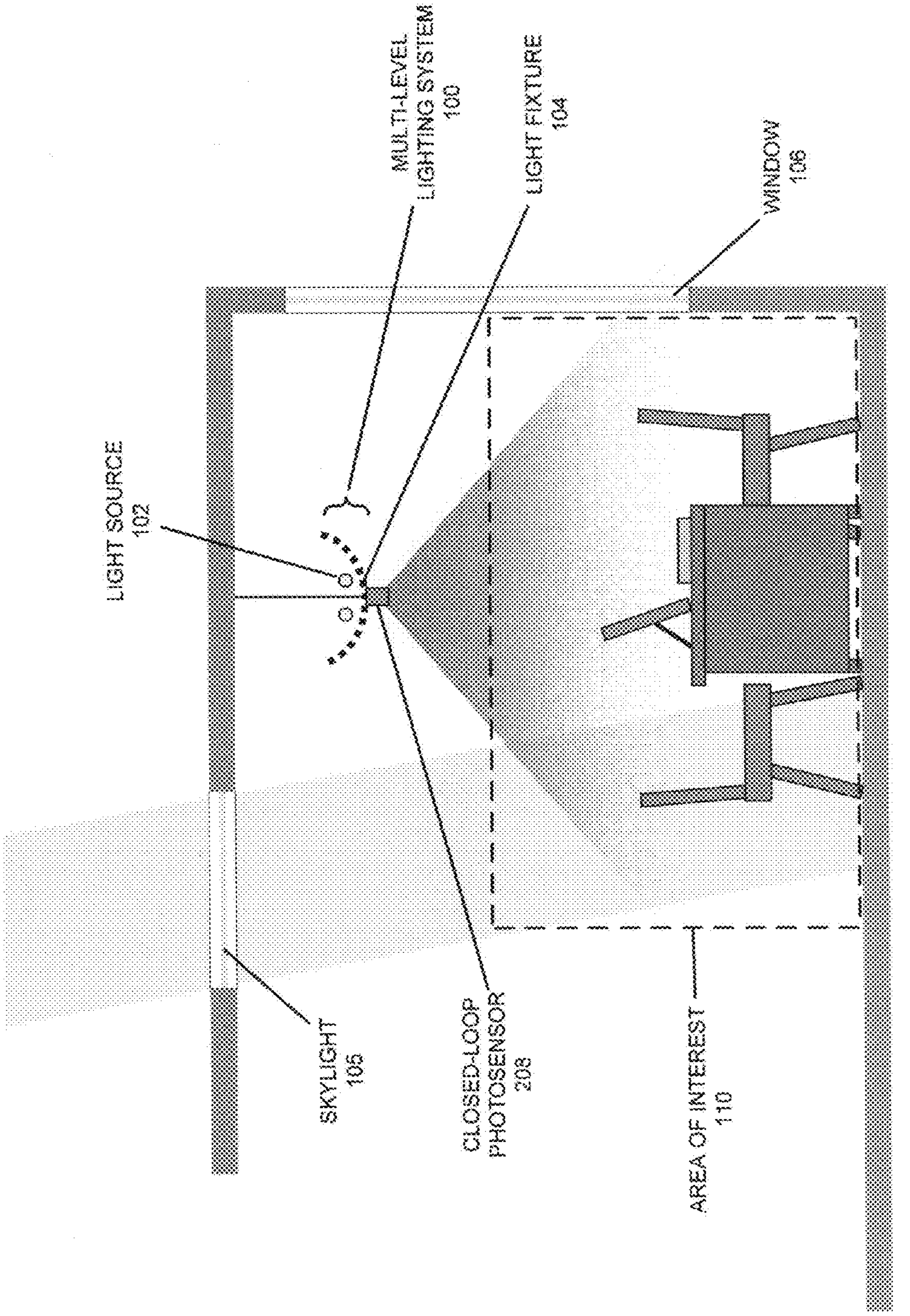
FIG. 2 illustrates a closed-loop daylight-harvesting system in accordance with an embodiment of the present invention.

FIG. 2 illustrates a closed-loop daylight-harvesting system. A closed-loop photosensor 208 is positioned to monitor the level of daylight in the area of interest 110. For instance, the closed-loop photosensor 208 may be positioned in the office space to monitor a work area and ensure that the area receives adequate lighting. In FIG. 2, the closed-loop photosensor 208 monitors both the output of the multi-level lighting system 100 as well as daylight entering from the skylight 105 and/or window 106.

Figure 3:
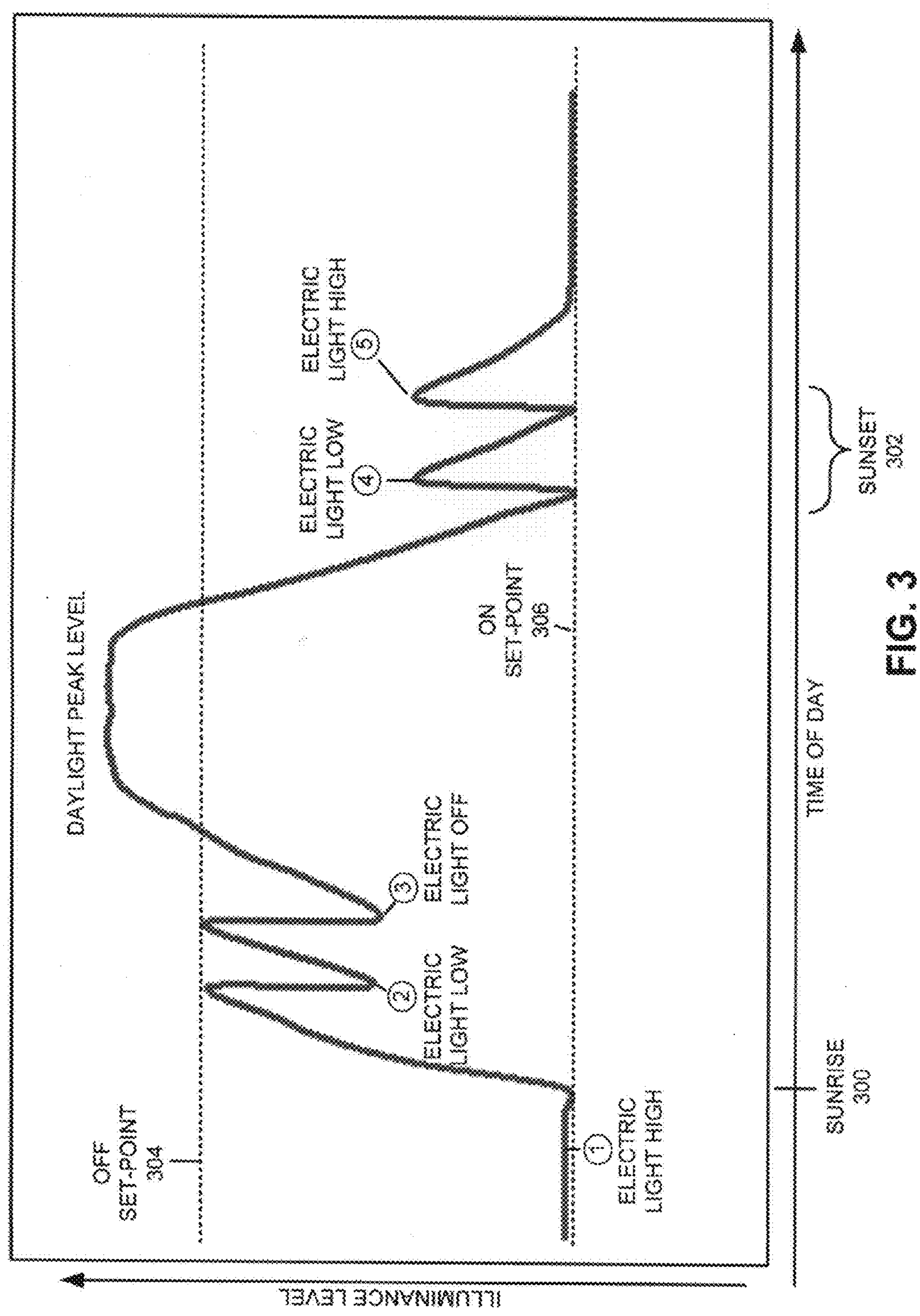
FIG. 3 illustrates an exemplary day of operation for a daylight-harvesting system in accordance with an embodiment of the present invention.

FIG. 3 illustrates an exemplary day of operation for a daylight-harvesting system with three light-output levels (e.g. off, electric light low, and electric light high) that are used during operation to maintain desired light levels. Before sunrise 300, the electric light system is typically the sole light source, and hence is set to high (point '1' in FIG. 3). After sunrise 300, the daylight-harvesting control system uses the photosensors to measure the additional daylight entering the area of interest. Eventually, the level of light in the area reaches the level of an off set-point 304. At this time, the control system changes the light output of the lighting system to a lower level (point '2' in FIG. 3). As the daylight increases, the control system again detects that the light level has reached the off set-point 304, and changes the lighting system to the off state (point '3' in FIG. 3). The lights may remain off during the peak daylight hours, until the end of the day approaches. As daylight wanes towards the end of the day, the detected light level in the area of interest drops to the level of an on set-point 306. At this point, the control system turns the lighting system on to the low light-output state (point '4' in FIG. 3). As sunset 302 approaches and the light level continues to drop, the system again detects that the light level has dropped to the on set-point 306, and eventually sets the light level to the high light-output state (point '5' in FIG. 3).

Both open- and closed-loop daylight harvesting systems typically require significant "commissioning," which involves: adjusting for the local environment; calibrating the system; and verifying that the system is (and remains) calibrated and functional. However, despite such commissioning, both the open-loop system and the closed-loop system can individually be fooled. In the open-loop system, the open-loop photosensor may sense daylight variations that do not necessarily affect the area of interest 110, such as outdoor changes in parts of the sky that do not affect the controlled space (e.g. morning hours on a west-facing space that does not face any surface that can reflect the direct sunlight coming from the east, or skylights that receive incoming light that is directional and does not affect the entire controlled space). In such situations, the system may dim the output of the lighting system based on the input from open-loop photosensor 108, leading to insufficient lighting.

In a closed-loop system, a change in reflectance in the area of interest 110 may cause the system to behave improperly. For instance, furniture shifting and/or occupants moving in a room may cause a change in the output measured by the closed-loop photosensor 208. This can lead to the system falsely determining that the level of daylight entering the area of interest has changed. In such a situation, the system may adjust the output of the lighting system to account for the supposed change in daylight, resulting in incorrect lighting changes. Incorrect lighting changes can cause occupants to disable daylight-harvesting systems, which eliminates potential energy savings.

Preventing Incorrect Lighting Adjustments

In one embodiment of the present invention, the system uses two photosensors to prevent incorrect lighting changes due to factors other than the variation of daylight in an area. It also includes a controller, which controls the light sources based on correlations between the two photosensors' signals. For example, the system may adjust the light output when both photosensors agree on a variation in the measured light level.

Figure 4:
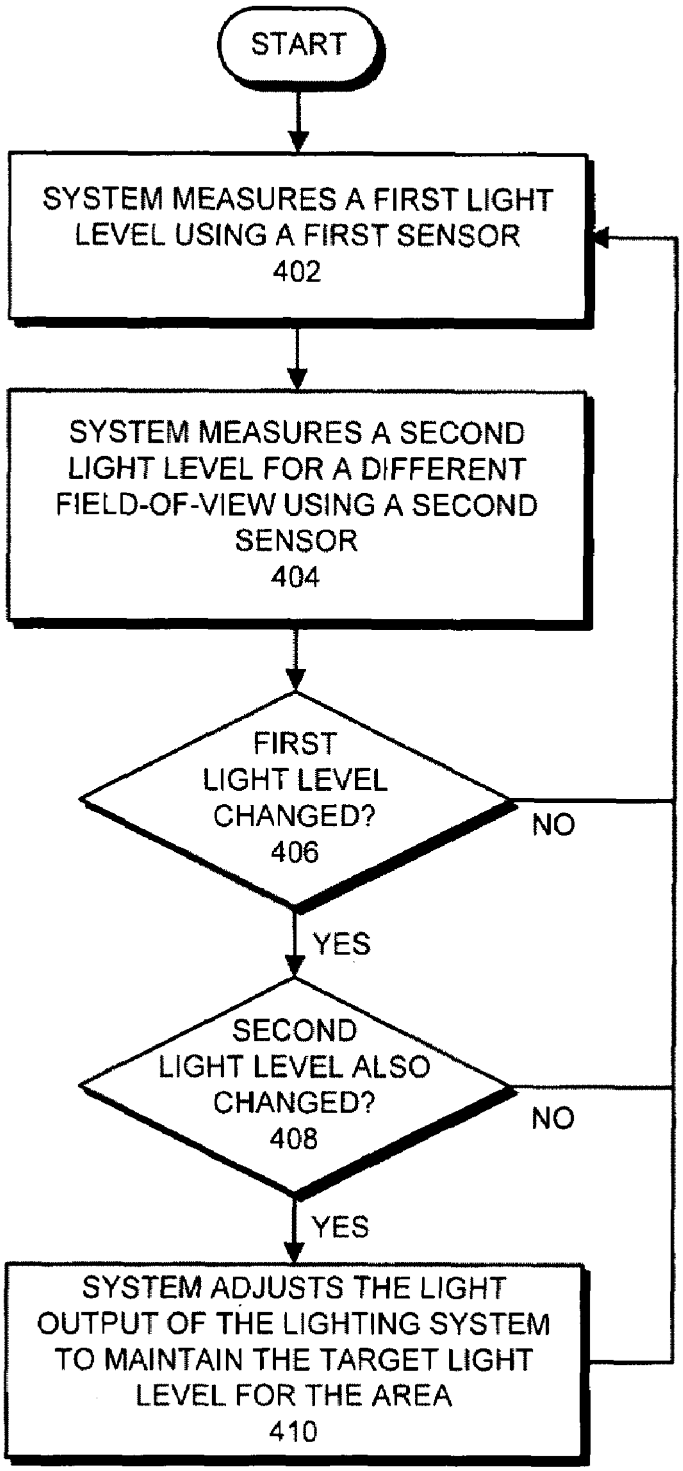
FIG. 4 presents a flow chart illustrating the process of preventing incorrect lighting adjustments in a daylight-harvesting system in accordance with an embodiment of the present invention.

FIG. 4 presents a flow chart illustrating the process of preventing incorrect lighting adjustments in a daylight-harvesting system. During operation, the system measures a first light level using a first sensor (step 402). Next, the system measures a second light level for a different field-of-view using a second sensor (step 404). If the system detects through the first sensor that the first light level has changed (step 406), the system determines whether the second sensor has also detected a change in the second light level (step 408). If both sensors agree that there is a change in the measured light levels, the system proceeds to adjust the light output of the lighting system and thereby maintain the target light level for the area (step 410). Otherwise, the system leaves the light output of the lighting system unchanged.

In one embodiment of the present invention, the system uses two or more closed-loop sensors with different fields-of-view to prevent incorrect lighting adjustments. The system can use the additional sensors to detect whether a change is localized to the area sensed by one of the sensors, with a simultaneous change in the output of all of the sensors being more likely to correspond to a change in the daylight entering the area.

In one embodiment of the present invention, the system uses a combination of open- and closed-loop sensors to prevent incorrect lighting adjustments. For instance, an open-loop sensor can be used to directly measure daylight light levels, e.g. by measuring an outdoor light level.

Figure 5:
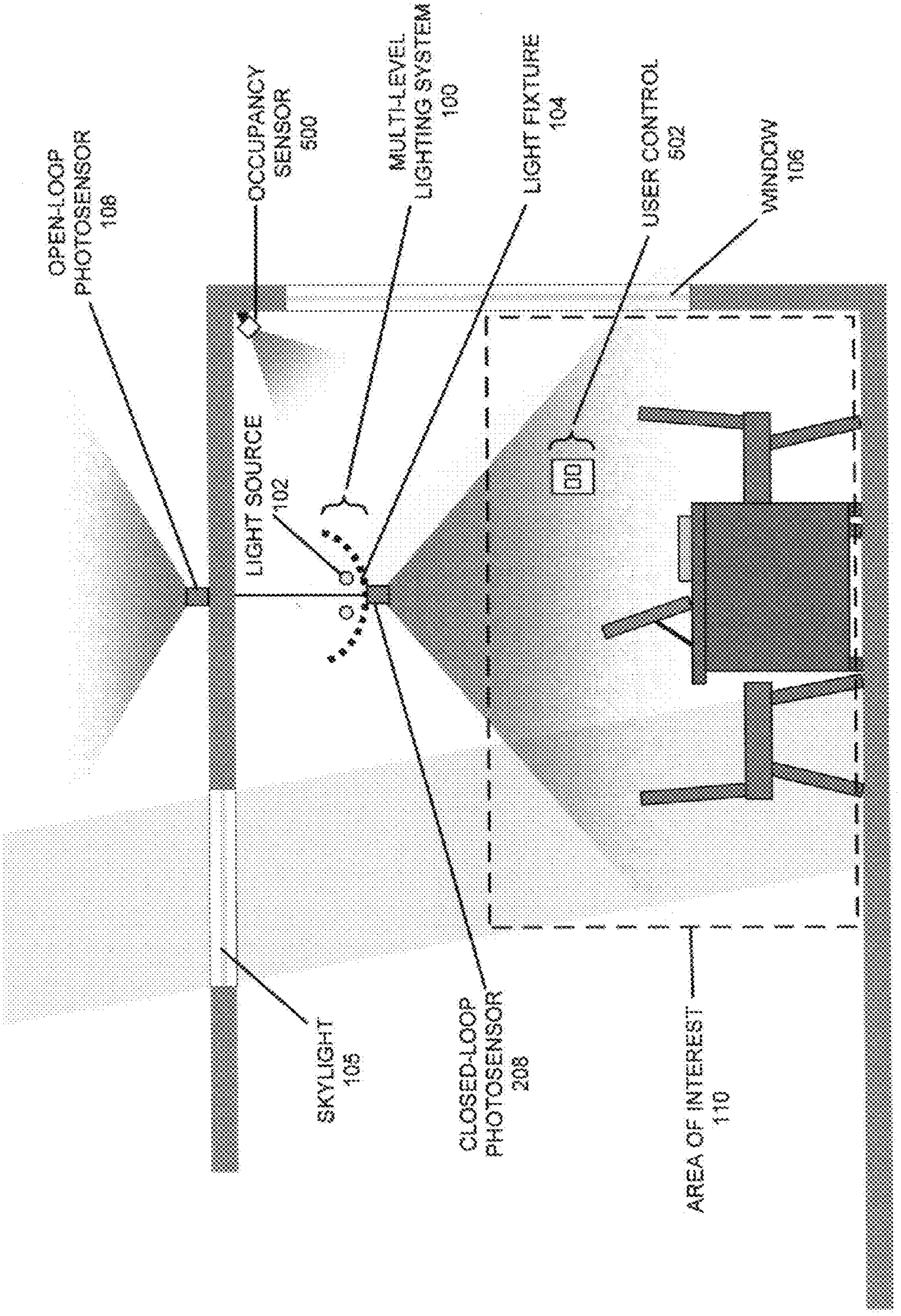
FIG. 5 illustrates a daylight-harvesting system that uses two photosensors to prevent incorrect lighting changes in accordance with an embodiment of the present invention.

FIG. 5 illustrates a daylight-harvesting system that uses two photosensors to prevent incorrect lighting changes. The illustrated daylight-harvesting system includes both an open-loop photosensor 108 as well as a closed-loop photosensor 208. By using a combination of open- and closed-loop sensors, the system can detect factors other than daylight variations which can cause incorrect lighting adjustments. For instance, if an occupancy change and/or change in reflectance in the area of interest 110 causes the signal output by the closed-loop photosensor 208 to change, but the output from the open-loop photosensor 108 indicates that the level of daylight outside has not substantially changed, the system can determine that the first change is due to a change in the internal environment that should not trigger a lighting change. Similarly, if the movement of the sun causes a change in the signal output by the open-loop photosensor 108, but the angle of the sun is such that no daylight enters the area of interest 110 to substantially change the output of the closed-loop photosensor 208, the system can determine that no lighting changes should be made. On the other hand, if a cloud blocks daylight entering the area of interest 110 through the skylight 105, the system can determine that the signals from the open-loop photosensor 108 and the closed-loop photosensor 208 agree that there is a change, and the system can increase the output of the multi-level lighting system 100 accordingly. By reducing the likelihood that the daylight-harvesting system is being fooled, the techniques described in this disclosure can reduce occupant annoyance caused by over-dimming and reduce energy waste caused by under-dimming.

Note that the angular response of a photosensor can be configured to correlate to the candlepower distribution of a lighting fixture, and that the components of the daylight-harvesting system can be configured in a number of possible embodiments. For instance, all of the daylight-harvesting components may be integrated into a single luminaire and/or light fixture (the terms luminaire, light fixture, and fixture are used interchangeably in the following document), with the open-loop photosensor positioned to point out of a window or skylight. Alternatively, the daylight-harvesting components may be included in a retrofit kit that is used to integrate daylight-harvesting functionality into an existing fixture. Another variation integrates daylight-harvesting components into one or more bi-level wall switches. The functionality of the daylight-harvesting system may vary depending on the location and choice of the daylight-harvesting components. The daylight-harvesting components for an integrated system can be optimized at the factory so that the angular acceptance, angular sensitivity, and spectral sensitivity of the photosensor match the characteristics of the fixture. For instance, a closed-loop photosensor may be adjusted to primarily (or only) monitor the area illuminated by an associated luminaire.

Note also that the daylight-harvesting system is a multi-level lighting system that can include an on-off lighting system and/or a dimming lighting system. The daylight-harvesting system can also include an occupancy sensor 500 and/or a user control 502, such as a fixture-mounted user control, a wall-mounted user control, and/or a wireless remote control. A user can use the user control 502 to customize system behavior and functionality.

In one embodiment of the present invention, light sources that affect the light level in the area illuminated by the daylight-harvesting system can include natural and/or artificial light entering the area from one or more of the following: a skylight; a window; a direct-beam daylighting system; an atrium; a clear-story window; and an electric-lighting source.

In one embodiment of the present invention, the daylight-harvesting system monitors the light levels measured by the photosensors over time. By monitoring the relationship between the light levels for the sensors, the system can customize operation based on characteristics of the local environment and improve the lighting control for the area. The system may adapt its response depending on correlations between the signals from the photosensors, for instance to adjust the length of a time delay used during light level adjustments to ensure that a change in the measured lighting level of the area is not due to a transient effect. In some situations, such time delays can interfere with the operation of the system when true daylight changes occur. When true daylight changes have been indicated by correlated changes confirmed by multiple sensors, such a time delay may be unneeded.

Sensor Variations

In one embodiment of the present invention, a number of sensors can be organized into a distributed sensor network to improve the lighting for multiple different areas while reducing system cost. For instance, a single open-loop sensor may be set up to work in conjunction with a number of closed-loop sensors, thereby improving system reliability.

Figure 6:
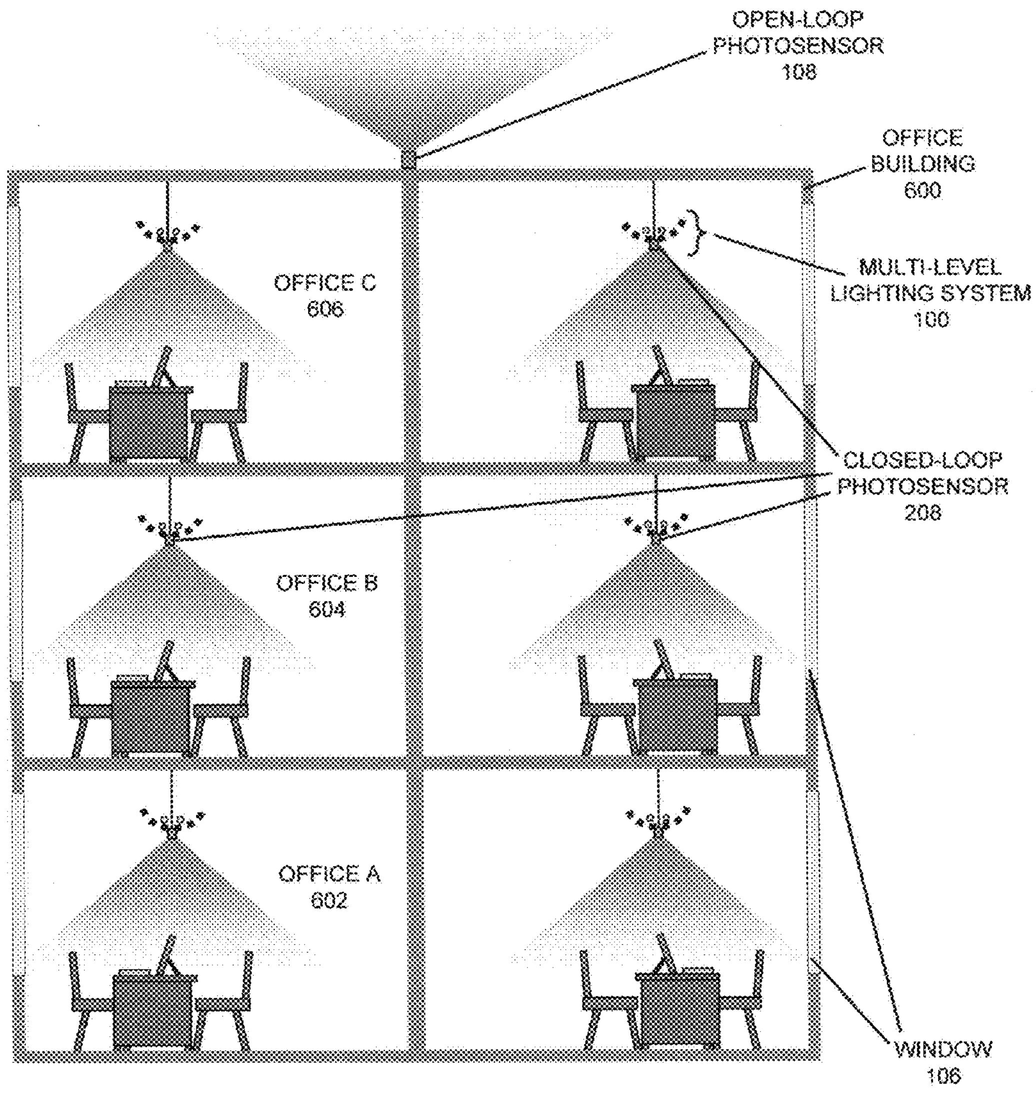
FIG. 6 illustrates a large, multi-story building in which each perimeter office contains a multi-level lighting system and closed-loop photosensor, and a single open-loop photosensor is mounted on the roof of the building in accordance with an embodiment of the present invention.

FIG. 6 illustrates a large, multi-story building in which each perimeter office contains a multi-level lighting system 100 and closed-loop photosensor 208. The building includes a single open-loop photosensor 108 that is mounted on the roof. Adding one open-loop photosensor 108 and adjusting the lighting systems' controllers to accept and consider input from the open-loop photosensor 108 can improve the reliability of the daylight-lighting systems with little additional cost. The photosensors may communicate their output to individual controllers using a wireless and/or wired network. Note that a controller may also be configured to also consider the output from multiple closed-loop photosensors 208 (both whether an open-loop photosensor 108 is available or not). For instance, the controller controlling the lighting system in office A 602 might consider the output from the three closed-loop sensors in offices A, B, and C 602-606 when considering lighting adjustments, since all three offices may share the same daylight effects.

In one embodiment of the present invention, a charge-coupled device (CCD) camera can be used as a photosensor and/or as a motion-detecting occupancy sensor. Note that one camera can be considered to be an array of sensors, e.g. as multiple photosensors. The multiple sensing pixels of the CCD can provide fine-tuned daylight and occupancy sensing by automatically measuring regions of the camera's field-of-view. Note that some regions of the CCD may be filtered to remove undesirable data. For instance, the system may look at only a portion of the darkest pixels or average across pixels to filter out non-representative effects such as glare or light from task lamps.

In one embodiment of the present invention, the sensitivity of the photosensor is adjusted to measure customized weights of light levels for an area. For instance, the sensitivity of the photosensor may be reduced for areas directly under the lighting sensor, which are closer to the photosensor than other areas with a different distance and/or angle of incidence. Adjusting the sensitivity of the photosensor allows the control system to measure substantially the same sensitivity from all incoming directions. Techniques that facilitate adjusting the sensitivity of the photosensor and measuring customized weights of light levels for the area can include one or more of the following:

- a baffle that customizes the field-of-view of the photosensor for an application and/or an environment; and
- a filter layer located between the photosensor and an area monitored by the photo sensor.

In summary, daylight levels in areas next to windows typically have enough daylight to eliminate the need for electric lighting for a significant portion of most days of the year. Daylight-harvesting systems can take advantage of this daylight to provide significant energy savings, but daylight-harvesting approaches that use a single photosensor are prone to several reliability issues. One embodiment of the present invention uses multiple photosensors to prevent incorrect lighting changes due to factors other than the variation of daylight in an area. Techniques that use multiple closed-loop photosensors or a mix of open- and closed-loop photosensors can improve the functionality and reliability of daylight-harvesting systems in commercial, residential, and other environments.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for preventing incorrect lighting adjustments in a daylight-harvesting system installed in a building, where the daylight harvesting system controls the output of a lighting system based on daylight and/or other light sources to reduce energy usage while providing a target light level for an area of the building, comprising:

- measuring a first light level using a first sensor that measures the current light level for the area;
- measuring a second light level for a second area different from the area of the building using a second sensor;
- detecting through the first sensor a change in the first light level;
- determining from the second sensor whether the second light level has also changed; and
- maintaining the target light level for the area;
- wherein maintaining the target light level for the area involves adjusting the light output of the lighting system when the first sensor and the second sensor detect a correlated change in measured light levels; and
- wherein adjusting the light output of the lighting system involves reducing the energy used by the lighting system when daylight and/or other light sources illuminate the area.

2. The method of claim 1, wherein the first sensor and the second sensor are used together to prevent incorrect lighting changes due to factors other than the variation of daylight in the area.

3. The method of claim 2, wherein the factors other than the variation of daylight in the area include one or more of the following:

- changes in occupancy and/or reflectance in the area; and
- daylight variations that do not affect the light levels in the area monitored by a sensor.

4. The method of claim 2,

- wherein the first sensor is a closed-loop sensor; and
- wherein the first light level measured by the first sensor includes both the light output of the lighting system as well as other light sources.

5. The method of claim 4, wherein two or more closed-loop sensors with different fields-of-view are used to prevent incorrect lighting changes.

6. The method of claim 4,

- wherein the second sensor is an open-loop sensor; and
- wherein the second light level measured by the second sensor is not affected by light emanating from the lighting system.

7. The method of claim 6, wherein the second light level relates to present daylight levels.

8. The method of claim 7, wherein the second light level is an outdoor light level.

9. The method of claim 1, wherein measuring a light level involves:

- monitoring the first light level and the second light level over time; and/or
- monitoring the relationship between the first light level and the second light level to improve the lighting control for the area.

10. The method of claim 1, wherein other light sources include natural and/or artificial light entering the area from one or more of the following:

a skylight;

a window;

a direct-beam daylighting system;

an atrium;

a clear-story window; and an electric-lighting source.

11. The method of claim 6, wherein the open-loop sensor can be used to improve the operation and reliability of two or more closed-loop sensors used to manage the light levels for different areas.

12. The method of claim 11, wherein a controller for the lighting system communicates with the open-loop sensor and/or one or more closed-loop sensors using a wired network and/or a wireless network.

13. The method of claim 1, wherein the lighting system can involve one or more of the following:

an on-off lighting system; and a dimming lighting system.

14. The method of claim 1, wherein one or both of the first sensor and the second sensor can be integrated into a light fixture.

15. The method of claim 1, wherein the first sensor is a photosensor.

16. The method of claim 15, wherein the first sensor is a camera.

17. An apparatus that prevents incorrect lighting adjustments in a daylight-harvesting system installed in a building, where the daylight harvesting system controls the output of a lighting system based on daylight and/or other light sources to reduce energy usage while providing a target light level for an area of the building, comprising:

a measurement mechanism configured to measure a first light level using a first sensor that measures the current light level for the area;

wherein the measurement mechanism is further configured to measure a second light level for a second area different from the area of the building using a second sensor;

a detection mechanism configured to detect through the first sensor a change in the first light level;

a determining mechanism configured to determine from the second sensor whether the second light level has also changed; and an adjustment mechanism configured to adjust the light output of the lighting system to maintain the target light levels for the area;

wherein maintaining the target light level for the area involves adjusting the light output of the lighting system when the first sensor and the second sensor detect a correlated change in measured light levels; and wherein adjusting the light output of the lighting system involves reducing the energy used by the lighting system when daylight and/or other light sources illuminate the area.

18. The apparatus of claim 17, wherein the first sensor and the second sensor are used together to prevent incorrect lighting changes due to factors other than the variation of daylight in the area.

19. The apparatus of claim 18, wherein the first sensor is a closed-loop sensor; and wherein the first light level measured by the first sensor includes both the light output of the lighting system as well as other light sources.

20. The apparatus of claim 19, wherein the second sensor is an open-loop sensor; and wherein the second light level measured by the second sensor is not affected by light emanating from the lighting system.

* * * * *